United States Patent Office 2,820,103
Patented Jan. 14, 1958

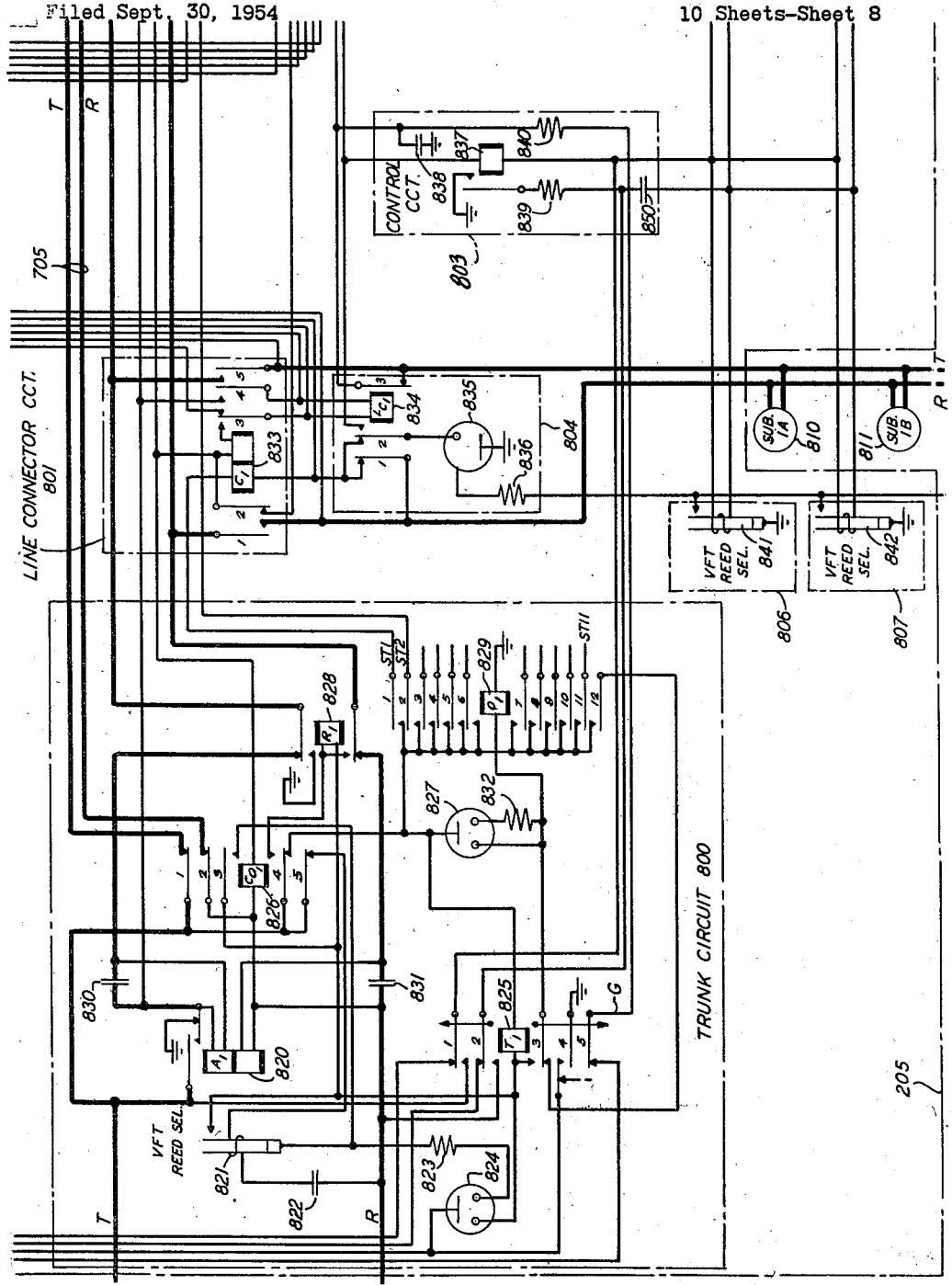

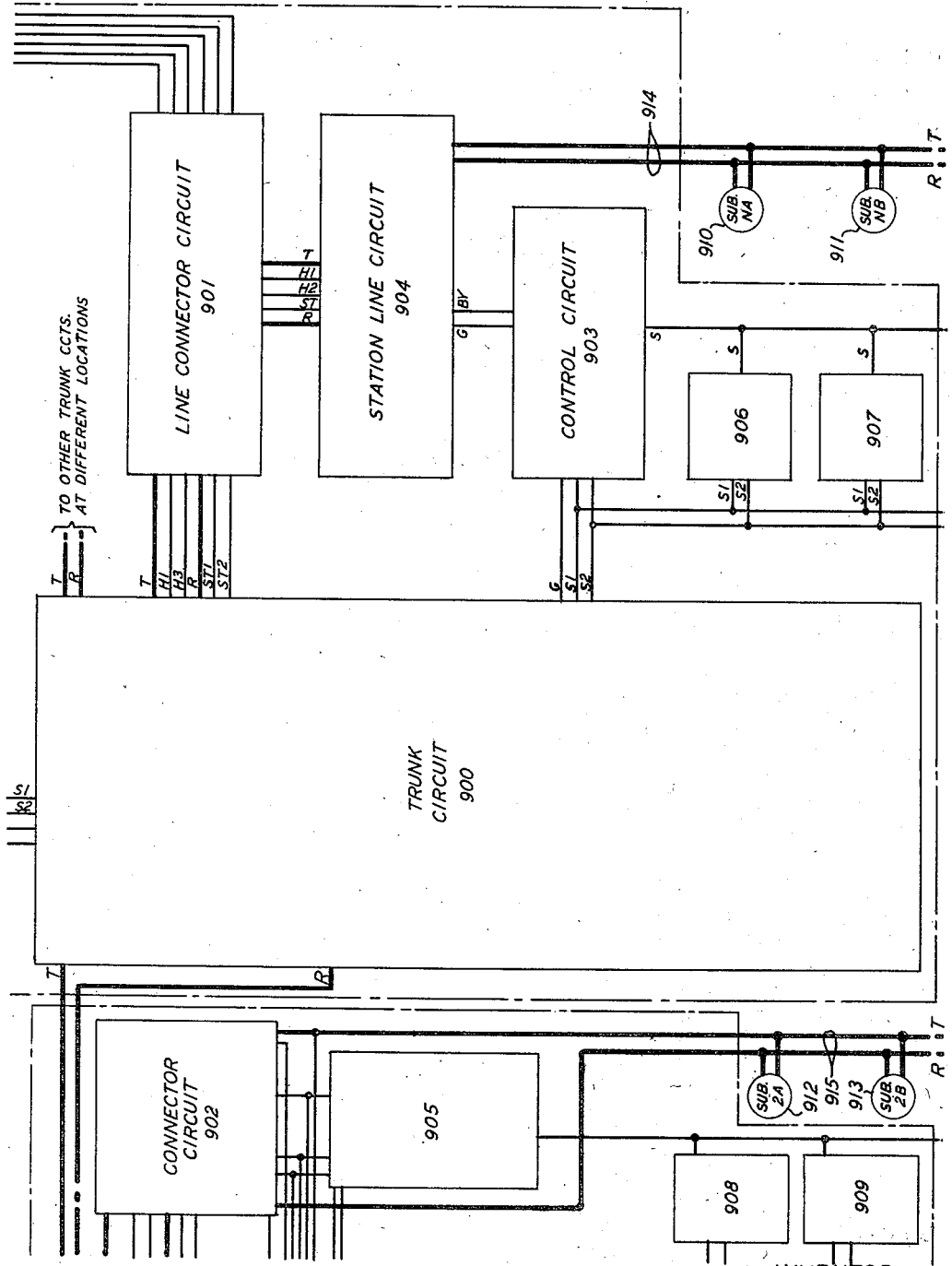

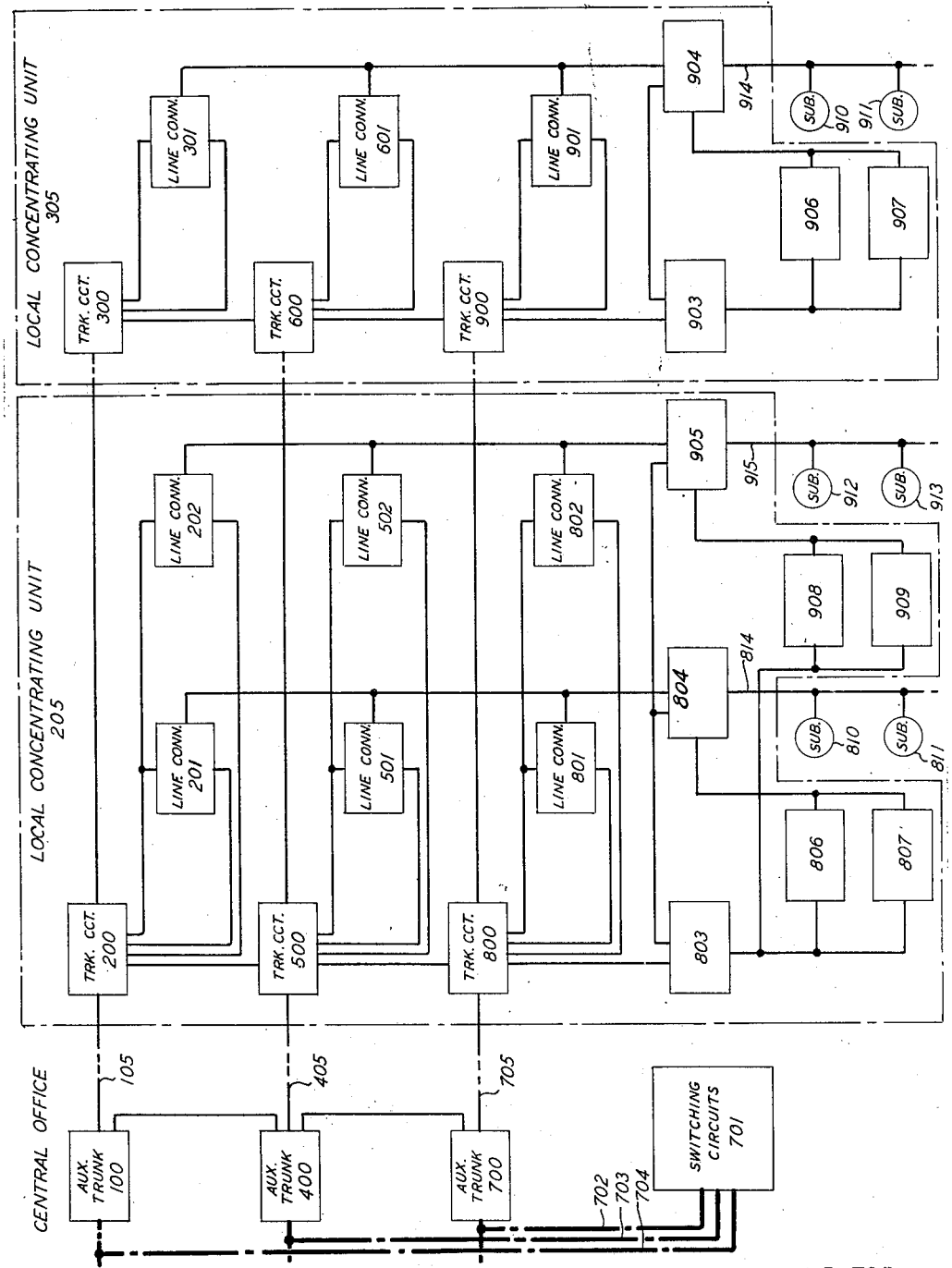

2,820,103

SUBSCRIBER LINE CONCENTRATING SYSTEM

Henry H. Abbott, Yonkers, N. Y., assignor to Bell Telephone Laboratories, Incorporated, New York, N. Y., a corporation of New York Application September 30, 1954, Serial No. 459,432

17 Claims. (Cl. 179—18)

This invention relates to telephone systems and more particularly to subscriber line concentrating systems.

Each subscriber substation normally requires a pair of wires to connect it with the central office. For a substation which is located at a considerable distance from the central office the cost of these wires is substantial. In fact, in the present day telephone plant, a large portion of the cost of installation and operation is that of the wire used in the subscriber loops between the substations and the central office. The utilization of line concentrating systems is attractive where the outside plant costs are high and the distances between groups of substations and the central office are large while the number of substations and the amount of local interconnecting traffic among the substations is not adequate to justify their connection to a separate community dial office.

Various line concentrating systems have heretofore been proposed which provide for a satellite office that operates as an automatic concentrator or switching center for servicing a plurality of such substations located in proximity thereto. Whenever the substations are widely scattered, such a satellite unit does not provide for sufficient economy of conductor mileage. Moreover a substation which is located between the central office and the satellite unit but closer to the satellite unit would be connected to the satellite unit by a telephone line which parallels the trunking route interconnecting the central office and the satellite office. Such a paralleling connection, which is hereinafter referred to as a "back-haul" connection, is disadvantageous economically and reduces transmission quality.

The elimination of back-haul is one of the principal objects of the present invention.

Another object of the present invention is to provide a line concentrator system which effects economies in the wiring connecting central offices with subscribers' substations.

A feature of the present invention relates to a communication system in which a large number of subscriber substations are connectable to a central office by a small number of common trunks.

Still another feature of the present invention pertains to a line concentrator system which does not require batteries or other power supplies at the remotely located concentrator units.

Still another feature of the present invention relates to line concentrator units which are suitable for mounting in boxes on telephone poles or the like.

Still another feature of the present invention relates to concentrator units which employ relays and avoid the use of switches so as to increase reliability, and reduce maintenance costs.

The present invention overcomes the difficulties and disadvantages inherent in prior systems and accomplishes the above and the following objects and features by providing a concentrating system which utilizes a plurality of concentrating units spaced along the trunking route and on which each have access to a group of trunks and to a plurality of proximate substations. In this manner, the subscriber lines are connectable to the trunks at the nearest practical point along the trunking route without any back-haul connections. The ability to distribute line concentrating units at various points along the route of various trunks enables substantial economies in outside plant equipment in comparison with those obtainable with the prior art satellite units.

Still another feature of the present invention, therefore, relates to a concentrating system having a plurality of concentrator units spaced at intervals along a trunking route.

For a terminating call, the selection of a particular line to be switched to a trunk through a remote concentrating unit is controlled by voice frequency tuned reed selectors in the concentrating units. The use of tuned reed selectors in the concentrating units avoids the use of rotary switches or comparable groups of stepping relays in the units and permits the reduction of the number of central office line terminals for a given group of stations because only one line terminal is required for each trunk rather than for each station.

Another feature, therefore, of the present invention relates to the provision of multifrequency signaling in a concentrating system.

A further feature of the present invention relates to the provision of a concentrating system wherein two signals are utilized; one for selecting a concentrator unit along the trunking route and the other for selecting a substation connected to the unit. The two signals together with the ringing current are provided through an idle trunk from the central office to the concentrator units which are located along the trunking route. One of the signals activates a vibrating reed selector in a trunk circuit in one of the concentrator units to provide a connection from the idle trunk to a plurality of vibrating reed selectors which are individual to the substations connected to the concentrator unit. When the station selector corresponding with the second transmitted signal is energized it connects the trunk to the called line so that the ringing current is applied thereto.

Further objects, features and advantages will become apparent to those skilled in the art upon consideration of the following description and the drawings wherein:

Figs. 1 through 9, when arranged in accordance with Fig. 10, are circuit representations of the line concentrating system of the present invention, wherein Figs. 1, 4 and 7 illustrate auxiliary trunk circuits at the central office;

Figs. 2, 3, 5, 6, 8 and 9 illustrate trunk circuits and line connector circuits at two concentrator units; and Figs. 8 and 9 additionally illustrate the subscribers' lines and associated circuits;

Fig. 10 illustrates the arrangement of Figs. 1 through 9; and

Fig. 11 is a functional or block diagram of the circuit arrangements shown in Figs. 1 through 9.

GENERAL DESCRIPTION

Figure 1:
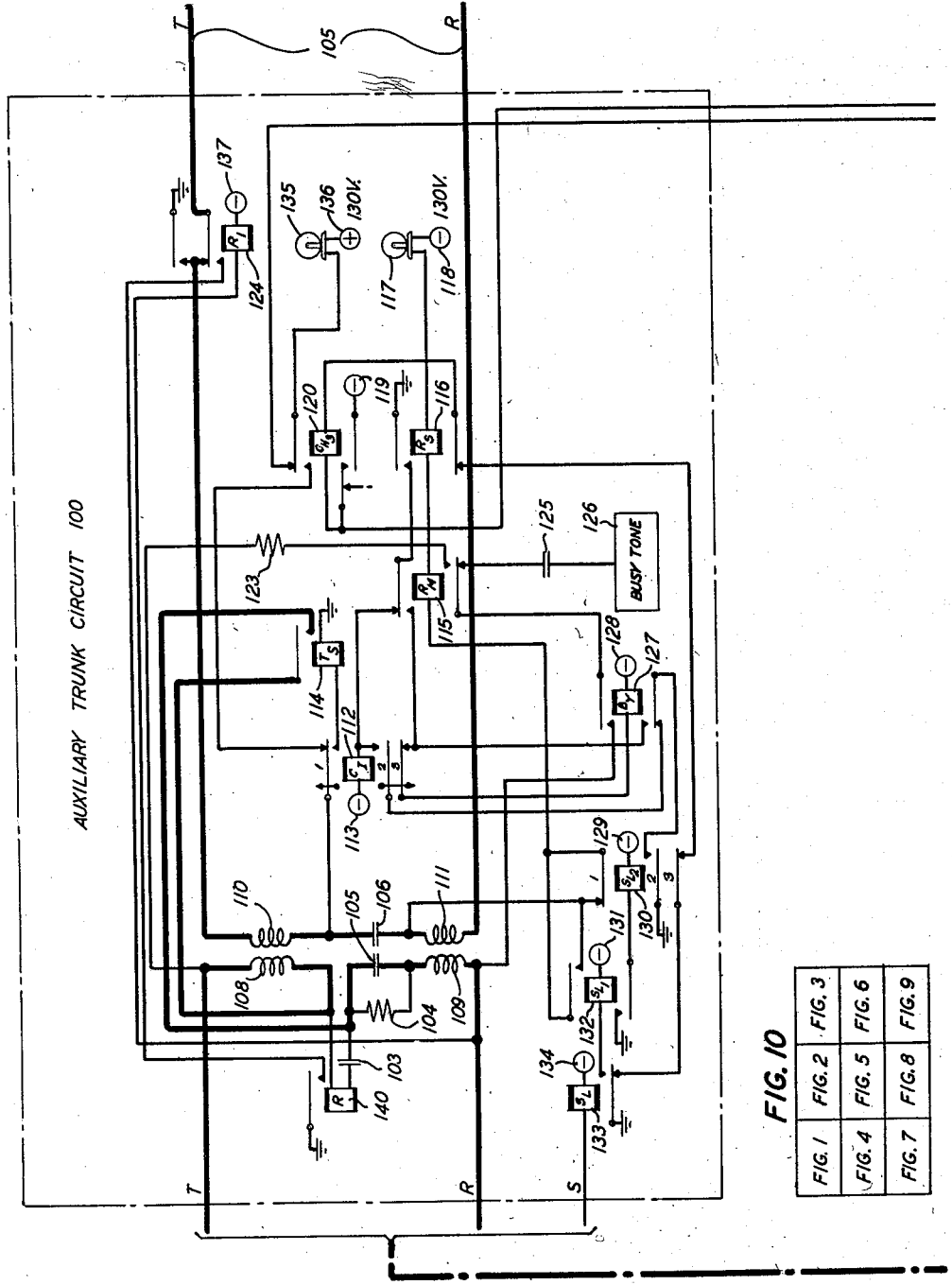
Figure 2:
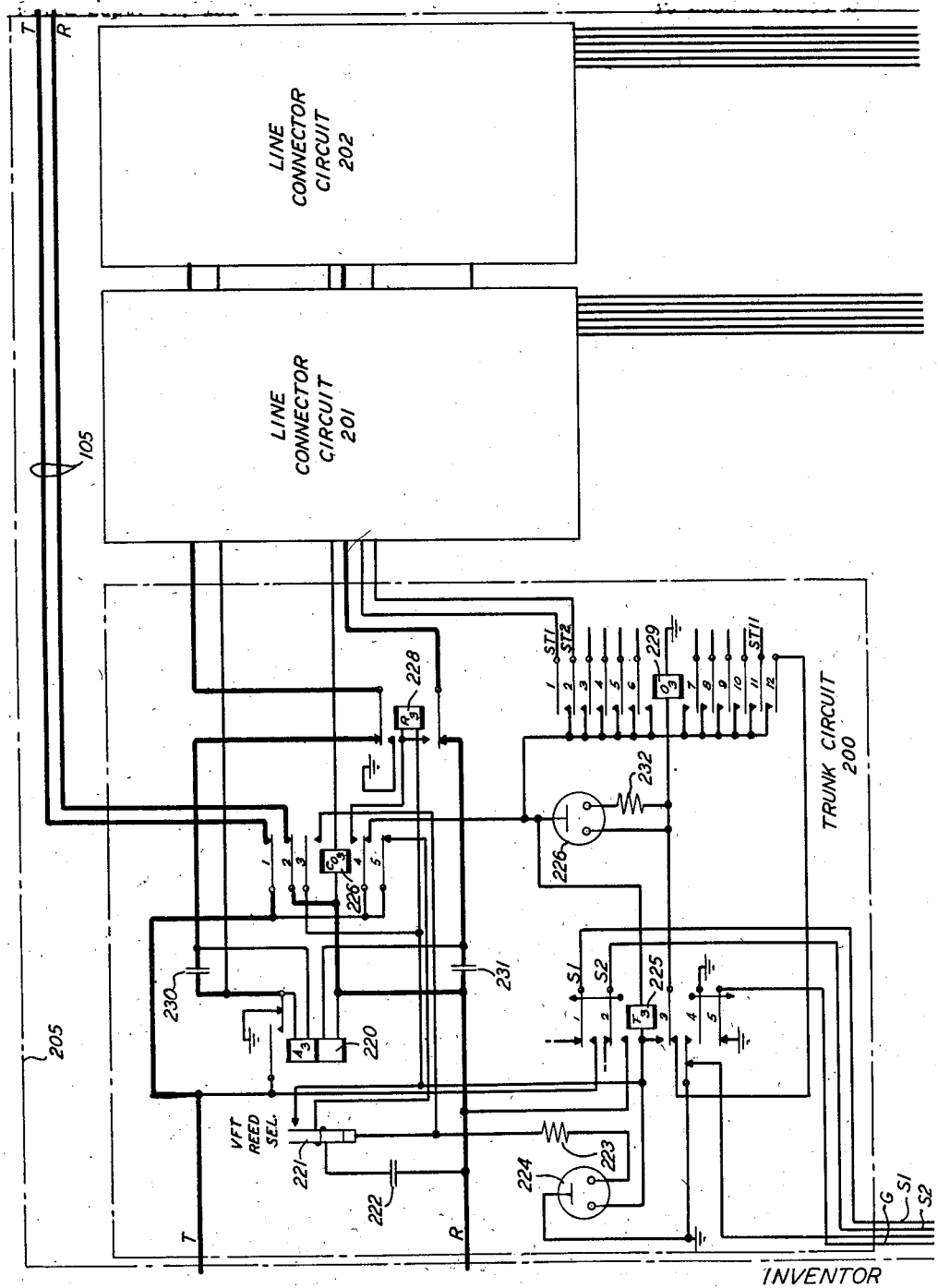
Figure 3:
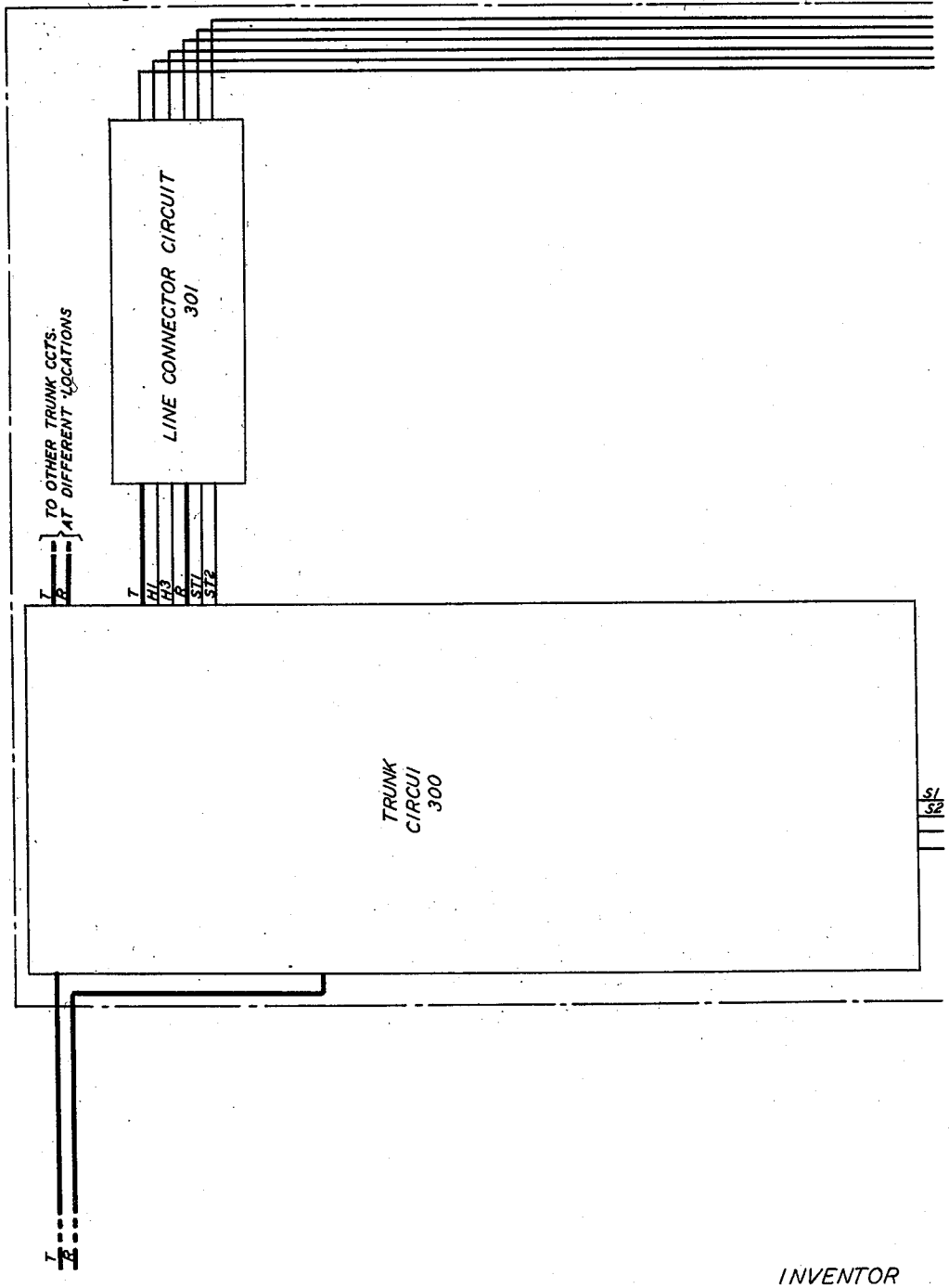
Figure 4:
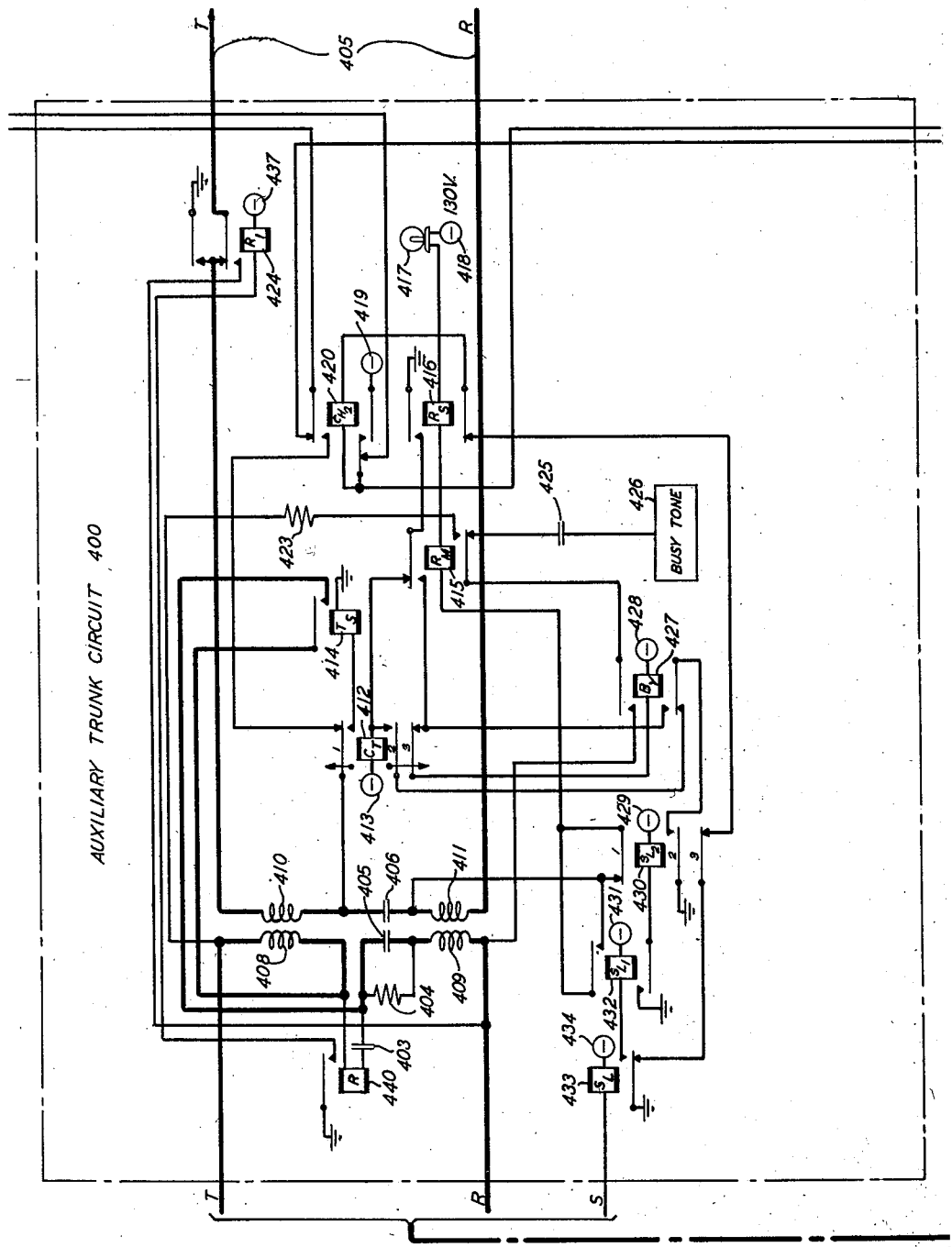
Figure 5:
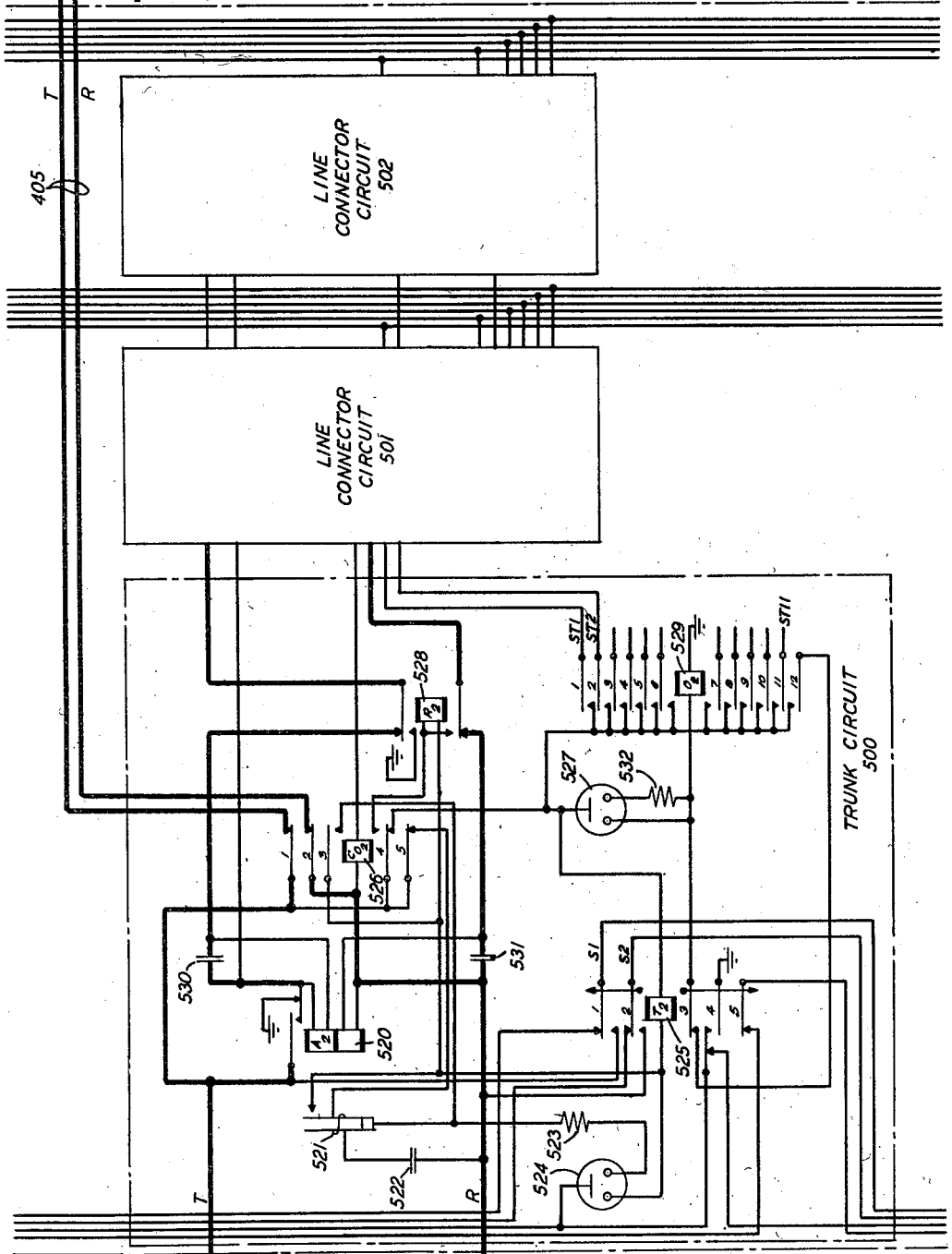
Figure 6:
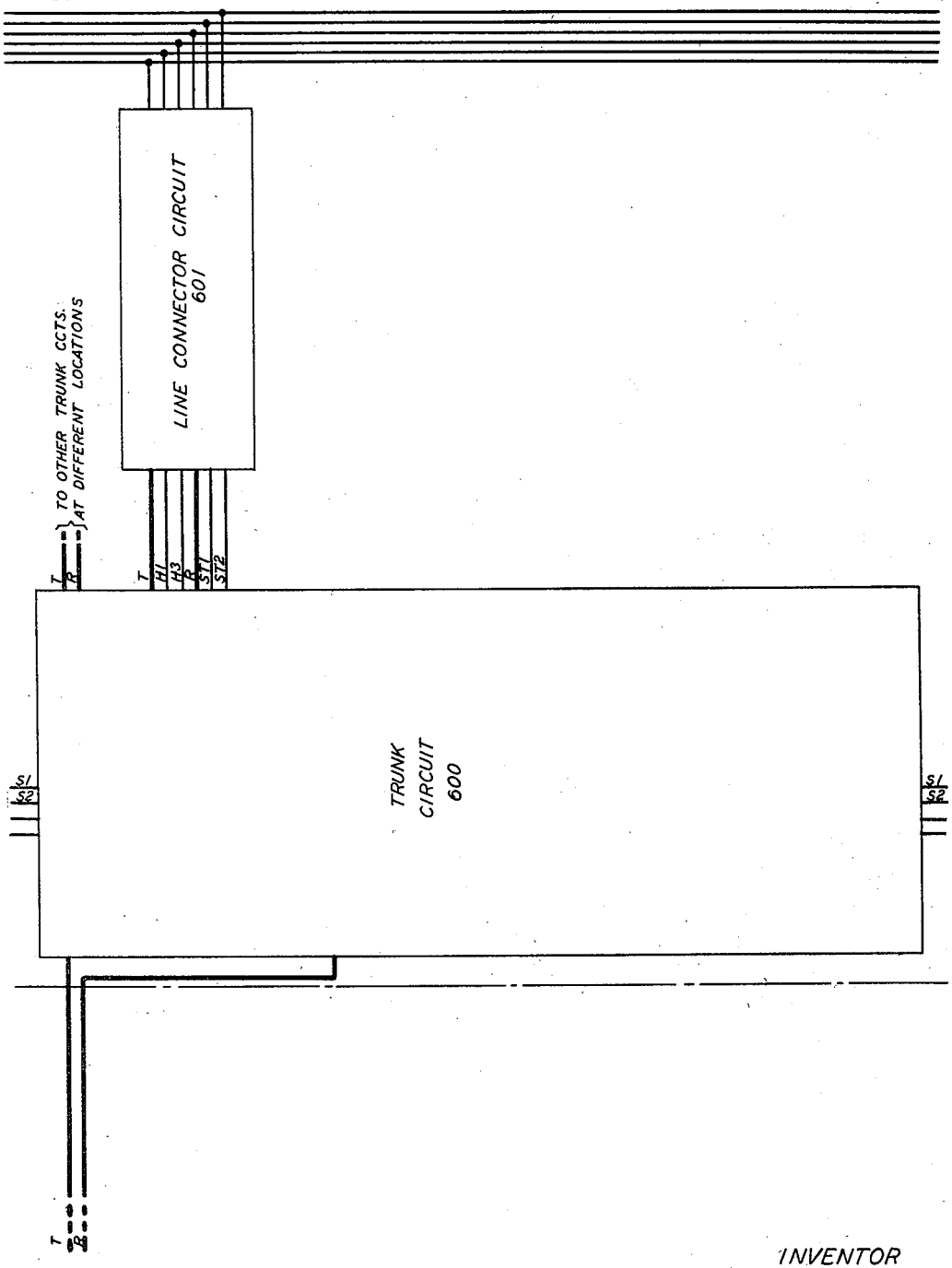
Figure 7:
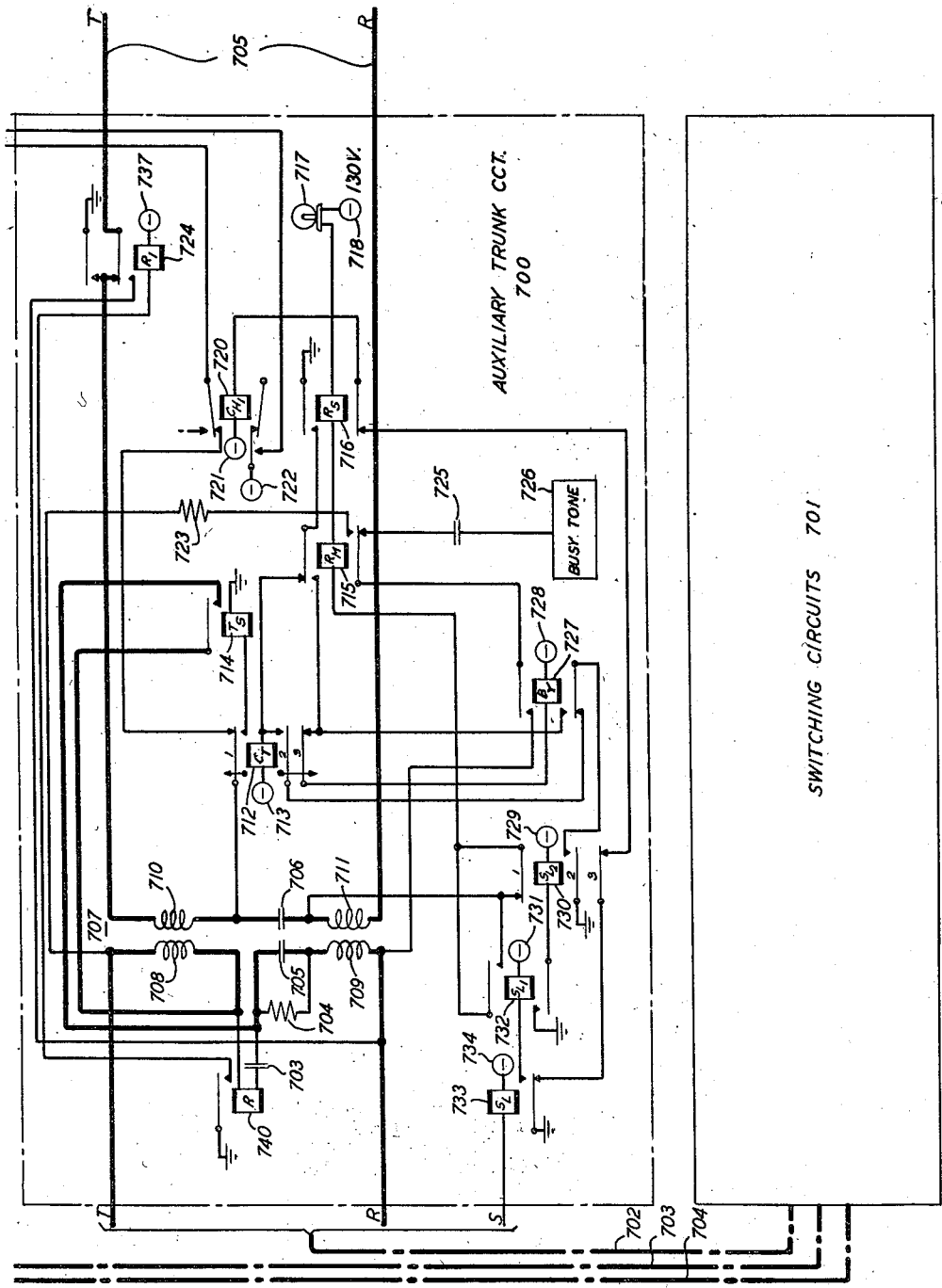

Referring to Fig. 11, which is a functional or block diagram of one embodiment of the concentrating system of the present invention, the first digit of each reference number indicates the detailed circuit diagram figure in which the circuit is shown. For example, the switching circuits 701 are shown in Fig. 7 of the detailed circuit diagram. The switching circuits 701 represent all the telephone equipment which is necessary to supply a multifrequency audio signal to a selected one of the trunks 702, 703, 704. Multifrequency equipment for selective ringing on a manual basis is disclosed in Patent 2,532,125 which issued to F. J. Singer-L. J. Stacy on November 28, 1950. Automatic multifrequency equipment for step-by-step systems is disclosed by the Patent 2,717,279, granted to R. C. Matlack-F. W. Metzger on September 6, 1955, and automatic multifrequency equipment for crossbar equipment is disclosed by the Patent 2,733,297 which issued to R. C. Matlack-F. W. Metzger, J. H. Miller-E. Vroom on January 31, 1956.

The present invention is not restricted to any particular type of telephone system. Moreover, while the description is directed broadly to a telephone system, it is applicable to other types of communication systems, such as teletypewriter, telegraph, computer and other information processing systems where it is desirable to enable a large number of dispersed and remotely located positions to be individually and selectively connected to a central position over a small number of common or concentrator trunks.

The switching circuits 701 are connected by the trunks 702, 703 and 704 to the central office auxiliary trunk circuits 700, 400 and 100, respectively. Though the specific embodiment of the concentrator system disclosed herein utilizes three trunks, a greater or lesser number may be utilized. The auxiliary trunk circuits 100, 400 and 700 are connected by trunks 105, 405 and 705, respectively, to the first local concentrator unit 205 and therefrom to the second local concentrator unit 305. Any number of concentrator units may be connected along the trunking route of trunks 105, 405 and 705 so as to avoid a paralleling connection from substations along the route.

Each of the local concentrator units 205, 305, etc. has a plurality of subscribers' lines connected thereto. In the specific embodiment disclosed herein, the concentrator unit 205 has connected thereto the lines 814 and 915 and the concentrator unit 305 has connected thereto the line 914 but any number of lines may be connected to each concentrator unit. Each of the subscribers' lines is connected to at least one substation which is located in the vicinity of the associated concentrator unit.

When all three trunks 105, 405 and 705 are idle, a positive potential is applied to the tip lead of one of the trunks and a negative potential is applied to the ring leads of all three trunks by the auxiliary trunk circuits 100, 400 and 700. Assume for the illustrative examples, hereinafter described, of the operation of the concentrator system that all trunks are idle and that a positive potential is applied to the tip lead of trunk 705.

When a call is originated at a substation, the associated line is connected to the trunk which has the positive tip potential applied thereto. For example, when a call is originated at substation 810, the associated line 814 is connected, as is hereinafter described, by the concentrator unit 205 to the trunk 705. The positive tip potential on trunk 705 readies trunk circuits 800 and 900 in the concentrator units 205 and 305 for originating calls. Each concentrator unit 205, 305, etc. has one trunk circuit for each of the three trunks 105, 405 and 705. In concentrator unit 205 the trunk circuits are designated 200, 500 and 800 and in the concentrator unit 305 the trunk circuits are designated 300, 600 and 900. Each trunk circuit has associated therewith one line connector circuit for each subscriber's line connected to the respective concentrator unit. Since there are two subscribers' lines, 814 and 915, connected to the concentrator unit 205, there are two line connector circuits for each of the trunk circuits 200, 500 and 800; the line connector circuits 201 and 202 are associated with the trunk circuit 200; the line connector circuits 501 and 502 are associated with the trunk circuit 500; and the line connector circuits 801 and 902 are associated with the trunk circuit 800. The three line connector circuits 201, 501 and 801 provide, as is hereinafter described, for connection between the subscriber line 814 and the trunks 105, 405 and 705, respectively, and the line connector circuits 202, 502 and 902 provide for a connection between subscriber line 915 and the trunks 105, 405 and 705, respectively. In the concentrator unit 305 there is only one subscriber's line, 914, so that only one line connector circuit is provided for each of the connector circuits; connector circuit 301 for trunk circuit 300; connector circuit 601 for trunk circuit 600; and connector circuit 901 for trunk circuit 900. The negative ring potential upon the trunks 105, 405 and 705 is connected respectively by the circuits 200, 500 and 800 to the connector circuits 201, 202, 501, 502, 801 and 802, and by the circuits 300, 600 and 900 to the circuits 301, 601 and 901. In addition to the three line connector circuits, each subscriber's line is connected to a station line circuit; the line 814 is connected to the station line circuit 804; the line 915 is connected to the station line circuit 905; and the line 914 is connected to the station line circuit 904.

As briefly described above, when a call is originated at the substation 810, the associated line 814 is connected by the concentrator unit 205 to the trunk 705 which has a positive 130-volt tip potential. The positive tip potential readies the associated trunk circuits 800 and 900 in the concentrator units 205 and 305. When a call is originated at the substation 810, the line connector circuit 801 is operated to cause the auxiliary trunk circuit 700 to remove the positive tip potential from trunk 705 and in turn cause the auxiliary trunk circuit 400 to apply it to trunk 405, if it is idle. The connector circuit 801 also functions to connect the line 814 through the connector circuit 810 and trunk circuit 800 to trunk 705, and to make busy the station line circuit 804.

When the line 814 is connected to trunk 705, the auxiliary trunk circuit 700 is signaled by the trunk circuit 800 of the occurrence of an originating call. The trunk circuit 800, in turn, short-circuits the tip and ring of the trunk 702 as a service request signal to the switching circuits 701.

Responsive to the service request signal the switching circuits 701 apply dial tone to the tip and ring leads and ground to the sleeve lead of trunk 702. The dial tone over trunk 702 from the switching circuits 701 is provided through the auxiliary trunk circuit 700, trunk 705, trunk circuit 800, line connector circuit 801 to line 814. The ground potential upon the sleeve lead of trunk 702 acts as a seizure potential for the auxiliary trunk circuit 700. When the subscriber at substation 810 dials the pulses are repeated by the trunk circuit 800 and the auxiliary trunk circuit 700 to the switching circuit 701. A talking connection from line 814 to trunk 705 is maintained throughout the dialing interval by the line connector circuit 801.

Responsive to the dial pulses the switching circuit 701 sets up a connection from trunk 702 to the called substation, not shown, and applies ringing tone thereto in a manner well known in the art.

When the call is completed and the subscriber at substation 810 restores the handset, not shown, a disconnect signal is provided by the trunk circuit 800 through the trunk 705 to the auxiliary trunk circuit 700 where it is repeated through trunk 702 to the switching circuits 701. Responsive to the disconnect signal the switching circuits 701 remove the ground seizure potential from the sleeve lead of trunk 702 causing the auxiliary trunk circuit 700 to return to normal and in turn return to normal the trunk circuit 800, line connector circuit 801 and the station line circuit 804.

At the completion of the call, therefore, if no other calls have been serviced by the concentrator units 205 and 305, the auxiliary trunk circuit 400 and trunk circuits 500 and 600 remain readied for originating calls from substations connected to the units 205 and 305. All of the other circuits are normal.

On a call to a substation on a line which is connected to one of the concentrating units 205 and 305, the switching circuits 701 seize an idle one of the three trunks 702, 703, 704 by applying a ground sleeve potential and transmit two selecting frequencies between 200 and 400 cycles superimposed on the 20-cycle ringing potential. One of the two selecting frequencies is for the selection of the concentrator unit and the other is for the selection of the substation connected to the unit. When the trunk 702, for example, is seized by the switching circuits 701, ground is supplied through the sleeve lead thereof to the auxiliary trunk circuit 700. The ground potential on the sleeve lead of trunk 702 causes the auxiliary trunk circuit 700 to remove the positive tip potential from trunk 705 so that the auxiliary trunk circuit 700 is effectively busy for any calls originated at any of the substations associated with the concentrating units 205 and 305. When the auxiliary trunk circuit 700 removes the positive tip potential from trunk 705, it conditions the auxiliary trunk circuit 400 to provide a positive tip potential over its associated trunk 405.

The 20-cycle ringing potential, which is transmitted from the circuits 701, is connected by the auxiliary trunk circuit 700 to the tip of the trunk 705. The ringing potential from the circuits 701 is of the negative superimposed type. Positive superimposed ringing potentials are avoided so that ringing conditions will never simulate an idle trunk condition in the concentrator unit.

One of the selecting frequencies superimposed on the 20-cycle ringing potential causes the trunk circuit 800 to operate and connect the station selector circuits 806, 807, 908 and 909 in the concentrator unit 205 to the trunk 705. The station selector circuits 806, 807, 908 and 909 correspond, respectively, to the substations 810, 811, 912 and 913 which are connected by lines 814 and 915 to the concentrator unit 205. The station selector circuits are frequency responsive. The station selector circuit, which is responsive to the second selecting frequency, operates to cause the associated line connector circuit to operate. When the substation 810 is being called, the station selector circuit 806 is responsive to the second superimposed or selecting frequency to cause the line connector circuit 801 to operate. When the connector circuit 801 operates, it provides a connection from the line 814 to the trunk 705 so that the ringing potential is effective to signal the subscriber of the substation 810.

When there are two or more substations on a line, such as substations 810 and 811 on line 814, each substation also includes a frequency responsive device which is tuned to the same frequency as its associated station selector circuit. Substations having such devices are disclosed in the above-identified disclosures by R. C. Matlack et al.

When the subscriber of substation 810 responds to the ringing potential, the trunk circuit 800 is operated to signal the auxiliary trunk circuit 700. During the silent interval of the ringing code the circuit 800 in turn signals the circuits 701 to trip ringing. The sequence of events for disconnect is similar to that described above for an originating call.

When line 814 is busy, for example on a call through trunk 405, a busy signal is provided by the control circuit 803, through the trunk circuit 800 and trunk 705 to the auxiliary trunk circuit 700. The circuit 700, in turn, provides a busy tone to the switching circuits 701. When all three trunks 105, 405 and 705 are busy, the tip potentials are removed so that originating calls are not recognized.

DETAILED DESCRIPTION

Originating call

Refer now to the detailed circuit diagram or Figs. 1 through 9 when arranged in accordance with Fig. 10. The switching circuits 701 represent the telephone equipment which is utilized to supply a multifrequency audio signal to the trunks 702, 703 and 704 and to respond to a call originated over one of the trunks 702, 703 and 704. Such equipment may be of the type described in the above-identified disclosures by R. C. Matlack et al. and patent to F. J. Singer et al.

The switching circuits 701 are connected by the trunks 702, 703 and 704 to the central office auxiliary trunk circuits 700, 400 and 100, respectively. The auxiliary trunk circuits 100, 400 and 700 are connected by trunks 105, 405 and 705, respectively, to the first local concentrator unit 205 and therefrom to the second local concentrator unit 305. Any number of concentrator units may be connected along the trunking route of trunks 105, 405 and 705 and any number of trunks, more or less, may be utilized.

When all three trunks 105, 405 and 705 are idle a negative potential is provided by the auxiliary trunk circuits 100, 400 and 700 on the three ring leads and a positive potential on one of the tip leads of the three trunks 105, 405 and 705. In the illustrative example described herein, a positive 130-volt potential is provided on the tip lead of trunk 705. This potential is provided by the +130 volt potential source 136 which is connected through the indicating lamp 135, the upper normal armature of the hold relay 120 in the auxiliary trunk circuit 100, the upper normal armature of the hold relay 420 in the auxiliary trunk circuit 400, the upper operated armature of the hold relay 720 in the auxiliary trunk circuit 700, the normal armature 1 of relay 712 through the winding 710 of the repeat coil 707, the lower normal armature of relay 724 to the tip lead of trunk 705. The three hold relays 120, 420 and 720 in the auxiliary trunk circuits 100, 400 and 700, respectively, are serially connected so that at least one of the three is operated at any given time. In the illustrative example described herein, relay 720 was originally operated over the path from the negative potential source 721, through the winding of relay 720, the lower normal armature of the reset relay 716, the normal armature 3 of relay 730 and the normal armature of the sleeve relay 733 to ground. When relay 720 is released, as is hereinafter described, the battery 722 is connected to the winding of relay 420 which is accordingly operated.

Positive potential on the tip lead of trunk 705 is applied to the trunk circuit 800 to ready it for an originating call from one of the substations 810, 811, 912 and 913 which are connected to the concentrator unit 205. The +130 volt potential on tip lead of trunk 705 is connected through the normal armature 4 of the cut-off relay 826 to the anode of the gaseous triode 827. The starting cathode of the triode 827 is connected through the resistor 832 and the winding of the originating relay 829 to ground. The presence of positive potential on the tip lead of trunk 705 accordingly causes the triode 827 to ionize and transfer the ionization to its main cathode and cause the relay 829 to operate. When the originating relay 829 operates it short-circuits the triode 827 by a path through the normal armature 3 of the trunk relay 825 and the operated armature 12 of relay 829 causing the triode 827 to extinguish. The originating relay 829 remains operated over this path through its operated armature 12 and readies the trunk circuit 800 as long as the +130 volt potential is provided to the trunk circuit 800 on the tip lead of the trunk 705. When, as is hereinafter described, the hold relay 720 in the auxiliary trunk circuit 700 is released, the +130 volt tip potential is removed from the trunk circuit 800 and the originating relay 829 is released. With all circuits normal, as described above, only relay 720 in the auxiliary trunk circuit 700 and the relay 829 in the trunk circuit 800 are operated. The trunk circuit 900 is similarly readied by the +130 volt potential over the tip lead of trunk 705 and the normal armature 1 of relay 826.

As described above, when all three trunks 105, 405 and 705 are idle, a −130 volt ring potential is applied to the trunk circuits 200, 500 and 800. In the auxiliary trunk circuit 700, for example, the battery 718 is connected through lamp 717, the windings of relays 716 and 715, the normal contact 1 of relay 730, the winding 711 of the repeat coil 707 to the ring lead of trunk 705. The ring lead of trunk 705 is connected through a winding of relay 820 in the trunk circuit 800 and the normal lower armature of relay 828 to the normal armatures 1 of relays 833 in the line connector circuits 801 and 902 so that the negative ring potential performs no function at this time.

When a call is originated at one of the substations which are connected to the concentrator unit 205, it is connected by concentrator unit 205 to the trunk 705. When a call is originated, for example, at the substation 810, a connection is provided therethrough, and through the ring lead of line 814, the normal armature 1 of the relay 834 of the station line circuit 804, the secondary winding of relay 833 in the line connector circuit 801, the operated armature 1 of the originating relay 829, the normal armature 4 of the cut-off relay 826 to the tip lead of trunk 705 which, as described above, is at a potential of +130 volts. The substation 810 is also connected through the tip lead of line 814, the normal armature 3 of relay 834, resistor 840 in the control circuit 803 which is shunted to ground by the capacitor 838, the serially connected armatures 5 of relays 825, 525 and 225 of the trunk circuits 800, 500 and 200, respectively, to ground. In this manner, when a call is originated at the substation 810, the connector relay 833 is operated. The connector relay 833 is operated when any of the substation switches 810 and 811 on the line 814 originates the call and the trunk circuit 800 has been readied by the auxiliary trunk circuit 700, as described above.

When relay 833 operates, it causes the operation of the relays 826, 834, 716 and 820 and connects the line 814 to the trunk 705.

Relays 826 and 834 are operated in series over a path from the ring lead of trunk 705 which is at a potential of −130 volts, as described above, through the winding of relay 826, the primary winding of relay 833, the operated armature 3 of relay 833, the winding of relay 834, the operated armature 4 of relay 833, and the normal contacts of relay 820 to ground. In this manner relays 826 and 834 are serially operated through the main winding of the connector relay 833.

When relay 826 operates, it opens the operating path at its armature 4 for the relay 829 which accordingly releases and opens the operating path through the secondary winding of relay 833. Relay 833, however, remains operated through its main winding.

Relay 820 is operated responsive to the operation of relay 833 along a path from the negative potential source 718, lamp 717, the winding of relays 716 and 715, the normal armature 1 of relay 730, coil 711 of the repeat coil 707, the ring lead of trunk 705, the lower winding of relay 820 shunted by capacitor 831, the lower normal armature of relay 828, the operated armature 1 of relay 833 through substation 810, the operated armature 5 of relay 833, the upper normal armature of relay 828, the upper winding of relay 820 shunted by the capacitor 830, to ground through the normal contacts of relay 820. When relay 820 operates it locks to the tip lead of trunk 705.

When relay 820 operates, it also connects the line 814 to the trunk 705. The tip lead of line 814 is connected through the operated armature 5 of relay 833, the upper normal armature of relay 828, the upper winding of relay 820 shunted by the capacitor 830, and the operated armature of relay 820 to the tip lead of trunk 705. The ring lead of line 814 is connected through the operated armature 1 of the relay 833, the lower normal armature of relay 828 and the capacitor 831 to the ring lead of trunk 705.

The current through the windings of relays 836, 833 and 824 from the battery 718 through the lower winding of relay 820 is also provided through the windings of the relays 715 and 716. Relay 716 operates but relay 715, which is a marginal relay, does not operate at this time. When relay 716 operates, it releases relay 720 to disconnect the +130 volt potential source 136 from the tip lead of trunk 705. The release of relay 720 also causes relay 420, as described above, to operate and provide the +130 volt potential on the tip lead of trunk 405. The +130 volt potential on the tip lead of trunk 403 readies the trunk circuit 500 by operating the originating relay 529 therein in a similar manner as described above in reference to relay 829 in the trunk circuit 800. The operation of relay 716 also causes the operation of relay 712 by connecting ground to the winding of relay 712 through the upper normal armature of relay 715 since the winding of relay 712 is also connected to the battery 713. The operation of relay 712 connects ground to the tip lead of trunk 705 through the winding of relay 714, the operated armature 1 of relay 712, winding 710 of the repeat coil 707 and the lower normal armature of relay 724. When relay 820 operates, local ground is removed from its contacts and ground on the tip lead of trunk 705 is applied to the upper winding of relay 820 to maintain it operated. The operating path for relay 820 is through the operated armature 4 of relay 833 through the winding of relay 834, the operated armature 3 of relay 833, the main winding of relay 833, the winding of relay 826 to the negative ring lead of trunk 705. The application of ground to the tip lead of trunk 705 through the winding of relay 714 therefore maintains operated relays 820, 834, 833 and 826 and also causes the operation of relay 714. When relay 714 operates, it closes a circuit between the tip and ring leads of trunk 702 from the tip lead of trunk 702 through the winding of the repeat coil 707, the operated armature of relay 714, the resistor 704, and the winding 709 of the repeat 707 to the ring lead of the trunk 702. In this manner the circuit is closed between the tip and ring leads of trunk 702 to the switching circuits 701. Responsive thereto, the circuits 701 supply dial tone to the tip and ring leads and a ground on the sleeve lead of trunk 702. The dial tone is repeated through the coil 707 to the trunk 705 and thence through the trunk circuit 800 and line connector circuit 801 to the line 814.

When the subscriber of substation 810 dials, the operating circuit of relay 820 is opened and closed causing it to follow the dial pulses. The primary winding of relay 820 is connected, as described above, through the upper normal armature of relay 828, the operated armature 5 of relay 833, the tip lead of line 814, through the dial contacts, not shown, in substation 810, the ring lead of line 814, the operated armature 1 of relay 833, the normal lower armature of relay 828, the secondary winding of relay 820 shunted by capacitor 820 to the negative ring lead of trunk 705. When relay 820 releases, it in turn causes the release of relay 714 but maintains by the local ground through its normal contacts the operation of relays 833, 826, 834 and 716. In this manner only the relays 820 and 714 follow the dial pulses. The dial pulses are repeated by the relay 714 by opening and closing the connection through its operated armature across trunk 702 through the trunk 702 to the switching circuits 701. Responsive to the reception of the dial pulses the switching circuits 701 connect the trunk 702 to the called party in a manner well known in the telephone switching art.

Throughout the dialing period, a talking path is maintained from the substation 810 through the line 814, the line connector circuit 801, the trunk circuit 800, the trunk 705 and the auxiliary trunk circuit 700 to the trunk 702 because the relays 833, 826 and 834 are maintained operated.

The ground provided to the sleeve lead of trunk 702, when dial tone is provided to the auxiliary trunk circuit 700 from the switching circuits 701, causes the sleeve relay 733 to operate. The operation of relay 733, in turn, causes the successive operation of relays 732 and 730. The operation of relay 730 opens the connection from the source 718 to the ring lead of trunk 705 but the preceding operation of relay 730 provided a shunting path through its upper operated armature. The operation of relay 730 also provides a locking path for relay 712 from ground at its operated armature 2 through the normal lower armature of relay 727 and the operated armature 2 of relay 712.

When the call is completed and the subscriber at substation 810 restores the handset, not shown, a disconnect signal is transmitted to the switching circuits 701 by the continued release of relay 820 in the trunk circuit 800 and responsive thereto the continued release of relay 714 in the auxiliary trunk 700. Responsive to the disconnect signal, the switching circuits 701 remove ground from the sleeve of the trunk 702 causing relay 733 to release. When relay 733 releases it in turn releases in succession the relays 732, 730 and 712. Relay 730 is of the slow-releasing type so as to produce momentarily an opening in the circuit from the negative battery 718 to the ring lead of trunk 705. This open interval proceeds from the time relay 732 releases until relay 730 releases. During this momentary open circuit of the ring lead of trunk 705, relays 833, 834 and 826 in the concentrating unit 205 release to restore the unit 205 to normal, and relay 716 in the auxiliary trunk circuit 700 releases. The release of relay 716 and the release of relay 730 open both operating paths described above for relay 712 causing it in turn to release restoring the auxiliary trunk circuit 700 to normal. If no other calls were serviced by the concentrator units 205 and 305 during the time the call originated from substation 810 was in progress, only the relay 420 in the trunk circuit 400, and the relays 529 in the trunk circuits 500 and 600, respectively, remain operated.

*Terminating call*

On a call to a substation which is connected to one of the concentrator units 205 and 305, which are in the trunking route comprising the trunks 105, 405 and 705, a multifrequency signal is provided by the switching circuits 701 to an idle one of the trunks 702, 703 and 704. The switching circuits 701 may be of the type described in the above-identified disclosures to R. C. Matlack et al. or of any type which can provide a multifrequency selecting signal. The signal provided by the switching circuits 701 for a terminating call to one of the remote substations comprises two audio frequency selecting potentials which are superimposed upon a 20-cycle ringing potential which is in turn superimposed upon a negative biasing potential. The signal therefore supplied by the switching circuits 701 comprises four components; a negative direct-current potential; a 20-cycle ringing potential; and two audio frequency selecting potentials. As is hereinafter described, the direct-current potential readies the trunk circuits associated with the utilized trunk; one of the selecting potentials selects the concentrator unit; the other selecting frequency selects the substation connected to the concentrator unit; and the ringing potential is applied to signal or alert the subscriber at the selected substation.

When the substation 810 is called, the switching circuits 701 seize an idle trunk, for example trunk 702, by applying a ground potential upon the sleeve lead thereof, and thereafter applying the multifrequency signal, described above, to the tip and ring leads thereof.

When ground is applied to the sleeve lead of trunk 702, it causes the operation of the sleeve relay 733 which is also connected to battery 734. When relay 733 operates, it in turn causes the operation of relay 732 and also releases the hold relay 720 if it is operated at this time. Relay 720 was operated as described above to connect the +130 volt battery 136 through the serially connected upper normal armatures of the hold relays 120 and 420 to the normal armature 1 of relay 712, the winding 710 of the repeat coil 707, and the normal lower armature relay 724 to the tip lead of trunk 705. The operating path for relay 720 is from battery 721 through the winding of relay 720, to the lower normal armature of relay 716, the normal armature 3 of relay 730 and the normal armature of relay 733. When relay 733 operates, it therefore opens the operating path for relay 720 causing it to remove the +130 volt potential from the tip lead of trunk 705. The tip lead of trunk 705 is connected through the normal armature 4 of relay 826, the operated armature 12 of relay 829, the normal armature 3 of relay 825, and the winding of relay 829 to ground. When the +130 volt potential is removed by the release of relay 720, relay 829 therefore also releases. When relay 720 releases, it also connects the source 722 through its normal lower contacts, the winding of relay 420, the lower normal armature of relay 416, the normal armature 3 of relay 430 and the normal armature of relay 433 to ground causing relay 420 to operate. The lower contacts of relays 120, 420 and 720 may be break-before-make contacts so that relay 120 does not operate even though battery 722 is briefly connected thereto through the lower contacts of relay 420. The connection through the lower contact of relay 420 is broken before locking battery 119 is connected to the winding of relay 120. When relay 420 releases due to the occurrence of an originating call or the seizure of trunk 703 by the circuits 701, relay 120 is operated. When relay 120 releases, relay 720 is once again operated so that as long as one of the trunks 105, 405 or 705 is idle one of the relays 120, 420, or 720 is operated. When relay 420 operates, it causes the operation of the originating relay 529, as described above, to ready the trunk circuit 500 for originating calls. Even if both relays 120 and 420 are operated, due to the serial connection through the upper normal armatures from battery 136, positive potential is applied only to the tip lead of trunk 105.

When the sleeve relay 733 operates, it in turn causes the operation of the relay 732. When relay 732 operates, it closes a parallel path through its upper operated armature for connecting the battery 718 to the ring lead of trunk 705 and causes the operation of relay 730. When relay 730 operates, it opens the first parallel path from battery 718 through its armature 1 and closes ground through its armature 2 to ready a locking path for the relay 712.

When the 20-cycle superimposed multifrequency potential is transmitted from the circuits 701 over the tip and ring leads of trunk 702, it causes the operation of the ring relay 740 which is connected to the tip lead through the winding 708 of the repeat coil 707 and to the ring lead through the capacitor 703, the parallel circuit consisting of resistor 704 and capacitor 705, and the winding 709 of the repeat coil 707. The operation of relay 740 closes ground to the winding of relay 724 which is also connected to battery 737. When relay 724 operates, it connects the ring lead of trunk 702 to the tip lead of trunk 705 so that the 20-cycle ringing potential is by-passed around the repeat coil 707 to the concentrator units 205 and 305. The tip lead of trunk 705 is connected to a vibrating reed selector 821 which may be of the type disclosed by G. E. Perrault in Patent 2,502,339 which issued on March 28, 1950, or may be any other suitable type of narrow-band Q magnetic vibrator having a normally open vibratile contact. The ring lead of trunk 702 is connected through the operated lower armature of relay 724, the tip lead of trunk 705, the normal armature 5 of relay 826 in trunk circuit 800, the winding of a vibrating reed selector 821, capacitor 822, the ring lead of trunk 705, the winding 711 of repeat coil 707, capacitor 706, the winding 710 of repeat coil 707 and the upper operated armature of relay 724 to ground. The junction of winding 711 and capacitor 706 is connected through the operated upper armature of relay 732, the windings of relays 715 and 716, and lamp 717 to battery 718. The path to ground through the upper operated armature of relay 724 provides a low impedance path for the audio selecting frequencies. The windings of relays 715 and 716 in the shunting path for the vibrating reed selector 821 introduce sufficient impedance to inhibit the operation of the selector 821 if used alone.

Similar paths are provided from the tip lead of trunk 705 through the winding of a vibrating reed selector, not shown, in the trunk circuit 900 of concentrator unit 305, to the ring lead of trunk 705. In this manner each of the trunks 105, 405 and 705 is bridged by one vibrating reed selector for each of the concentrator units 205 and 305. In the concentrator unit 205, for example, the trunk 105 is bridged by the selector 221, the trunk 405 by the selector 521 and the trunk 705 by the selector 821 as described above. The selectors 221, 521 and 821 are responsive to the same selecting frequency and all the selectors, not shown, in the concentrator unit 305 are responsive to a different selecting frequency.

As described above, the multifrequency ringing signal that is applied by the switching circuits 701 to the trunk 702 and thus to the trunk 705 comprises two audio frequency selecting potentials, a negative biasing potential and the 20-cycle ringing potential. One of the two selecting frequencies applied by the switching circuit 701 is for the selection of the concentrator unit 205, 305, etc. to which the called subscriber's substation is connected. In the illustrative embodiment described herein, the called substation is substation 810 so that one of the audio frequency selecting potentials provided through trunk 705 operates the tuned reed selector 821. When the tuned reed selector 821 is operated, it closes a path from the tip lead of trunk 705 through the normal armature 4 of relay 826, the winding of the trunk relay 825, through the operated contact of the selector 821 and resistor 823 to the starting cathode of the gaseous triode 824. The anode of the triode 824 is connected through the serially connected normal contact of armatures 4 of relays 525 and 225 to ground. In this manner a connection is provided by the operation of selector 821 from the tip lead of the trunk 725 to the starting cathode of the triode 824 which, due to the presence of the negative biasing potential in the multifrequency ringing signal, ionizes. The ionization in the triode 824 is transferred across the main gap thereof to cause the trunk relay 825 to operate. The triode 824 operates only when the ringing signal supplied thereto is of the negative superimposed type.

The operation of the trunk relay 825 in turn causes the operation of the relay 829 and at the same time locks through its operated armature 3 to the ground at the winding of relay 829. The operation of relay 825 also connects the station selector circuits 806, 807, 908 and 909 through the operated armatures 1 and 2 of relay 825 to the tip and ring leads, respectively, of the trunk 705. When selector 821 responds, it therefore functions as a switch to connect the selector circuits 806, 807, 908 and 909 to the trunk 705. Each circuit, 806, 807, 908 and 909, comprises a vibrating reed selector 841, 842, etc. tuned to an individual frequency corresponding to an associated substation, 810, 811, 912, 913. The second audio frequency selecting potential provided through the tip lead of trunk 705 from the switching circuits 701 causes the operation of one of the selectors 841, 842, etc., which is associated with the called substation. In the illustrative example described herein, the selector 841, which is associated with the substation 810, is operated. The operating path for selector 841 is from the switching circuits 701, the ring lead of trunk 702, the operated lower armature of relay 724, the tip lead of trunk 705, the operated armature 1 of relay 825, the winding of selector 841, capacitor 850, the operated armature 2 of relay 825, the ring lead of trunk 705, winding 711, capacitor 706, winding 710, and the upper operated armature of relay 724 to ground. The operation of the selector 841 closes a circuit from ground to the starting anode of the triode 835 through the resistor 856, in the station line circuit 804. The main anode of triode 835 is connected to ground and the cathode of triode 835 is connected through the normal armature 2 of relay 834, the secondary winding of the connector relay 833 in the line connector circuit 801, the operated armature 1 of relay 829, and the normal armature 4 of relay 826, to the tip lead of trunk 705 which still has the superimposed negative biasing potential thereon. The transfer of ionization in the triode 835, therefore, causes the operation of the connector relay 833 to connect the line 814 of substation 810 to the trunk circuit 800. The ring lead of line 814 is connected through the operated armature 1 of relay 833, the lower normal armature of relay 828 and the secondary winding of relay 820, which is shunted by the capacitor 831, to the ring lead of trunk 705. The tip lead of line 814 is connected through the operated armature 5 of relay 833, the upper normal armature of relay 828 and the main winding of relay 820, which is shunted by the capacitor 830, through the normal contacts of relay 820 to ground. The operation of relay 833 also causes the operation of the relays 834, 826, and 716. The operating path for the relays 716, 826 and 834 is from the negative battery 718 through the lamp 717, the winding of relays 715 and 716, the operated upper armature of relay 732, the winding 711 of coil 707, the ring lead of trunk 705, the winding of relay 826, the main winding of relay 833, the operated armature 3 of relay 833, the winding of relay 834, the operated armature 4 of relay 833 and the normal contacts of relay 820 to ground. Relay 715 being a marginal type relay does not operate at this time.

The operation of relay 826 removes the multifrequency signal from the tip lead of the portion of trunk 705 which is connected from the armatures 1 and 2 of relay 826 to the concentrator unit 305. Relay 826 also causes the operation of the ring relay 828 by transferring at its armature 4 the connection from the tip lead of trunk 705, and opens the operating path for the selector 821 and the relays 825 and 829 which release. The operating path for relay 828 is from the tip lead of trunk 705 through the operated armature 4 of relay 826, the winding of relay 828, through triode 824, and the serially connected normal contacts of armatures 4 of relays 525 and 225 to ground. When relay 826 operates, it also opens the operating paths at its armature 4 for the relays 825 and 829 causing them to release. The release of relay 825 in turn causes the release of selector 841.

When relay 828 operates, it connects the tip lead of trunk 705 to the ring lead of line 814 and connects the tip lead of line 814 to ground. The connection from the tip lead of trunk 705 is through the operated armature 4 of relay 826, the operated lower armature of relay 828, the operated armature 1 of relay 833, to the ring lead of line 814 and the connection from the tip lead of line 814 is through the operated armature 5 of relay 833 and the operated upper armature of relay 828 to ground. The multifrequency superimposed ringing potential is in this manner connected from the switching circuits 701, through the ring lead of trunk 702, and the tip lead of trunk 705 to the ring lead of line 814, and the tip lead of line 814 is connected to ground.

If the substation 810 is the only substation or party on the line 814 it may be any type which provides an audible or visual indication responsible to the application of ringing tone thereto as is well known in the art. When there is more than one party on the line, each substation must be of the type which includes a frequency responsive device. Such substations may be of the type described in the above-identified applications by R. C. Matlack et al. The substation 810 is responsive to the same frequency as the selector 841 in the associated station selector circuit 806, and the substation 811 which is also on line 814 is responsive to the same frequency as the selector 842 in the circuit 807. In this manner the concentrator system of the present invention services party lines having any number of parties as well as individual lines having one party.

The operation of relay 834 opens the operating circuit through the secondary winding of relay 833 and for the tube 835. The operating path of tube 835 is also opened at the armature 1 of relay 829. Relay 833 remains, however, operated through its main winding. The operation of relay 716 in the auxiliary trunk circuit 700 causes the operation of relay 712 which locks the ground through its operated armature 2, the normal lower armature of relay 727 and the operated armature 2 of relay 730.

When the subscriber of substation 810 responds to the ringing potential and removes the receiver, not shown, a circuit is closed through substation 810 from ground at the upper operated armature of relay 828 to the winding of relay 828. During the ringing interval relay 828 remains operated but during the silent interval of the ringing code, which may be for example two seconds on and four seconds off, relay 828 releases and tube 824 deionizes. When relay 828 releases, the operating path, described above, from ground at the normal contacts of relay 820 is established for relay 820 through substation 810 to the ring lead of trunk 705.

When relay 820 operates, it closes a path from the tip lead of trunk 705 through its operated armature to the operated armature 4 of relay 833, the winding of relay 834, the operated armature of relay 833, the main winding of relay 833, the winding of relay 834, to the ring lead of trunk 705 which is at a −130 volt potential. At the same time that relay 828 releases, the absence of ringing potential during the silent interval of the ringing code causes relay 740 in the auxiliary trunk circuit 700 to release and in turn release relay 724. When relay 724 releases, it connects the tip lead of trunk 705 through its lower normal armature, the winding 710, and the operated armature 1 of relay 712 to the winding of relay 714 causing it to operate. When relay 714 operates, it provides a connection from the tip lead of trunk 702, through winding 708, the operated armature of relay 714, resistor 704 and winding 709 to the ring lead of trunk 702 to cause the switching circuits 701 to trip ringing.

When relay 820 operates, it also transfers a connection from local ground to ground at the winding of relay 714 so that relays 834, 833 and 826 are maintained operated.

If the subscriber at substation 810 does not respond during the first ringing interval, the relays 740, 724 and 828 are released and then reoperated during the next ringing interval. Relay 714 which functions to trip the ringing potential is operated only when the subscriber has responded and ringing potential is absent.

During the call, after the subscriber at substation 810 has responded, the following relays shown in Figs. 1 to 9 remain operated: Relays 733, 732, 730, 712, 714 and 716 in the auxiliary line circuit 700; relays 820 and 826 in the trunk circuit 800; relay 833 in the line connector circuit 801; relay 834 in the station line circuit 804; and if no other calls have been or are being serviced by the units 205 and 305, relay 420 in auxiliary trunk circuit 400, and relay 529 in the trunk circuit 500, and a relay in the trunk circuit 600.

At the termination of the call, when the subscriber at substation 810 hangs up, the the operating path for relay 820 is opened causing it to release and in turn release relay 714. When relay 714 releases, it opens the connection from the tip lead to the ring lead of trunk 702 to signal the switching circuits 701. When the switching circuits 701 remove the ground from the sleeve lead of trunk 702, relays 733, 732 and 730 successively release. Relay 730 is slow to release so that there is an interval when the battery 718 is disconnected from the ring lead of trunk 705. During this interval, relays 716, 826, 833 and 834 release to disconnect line 814 from trunk 705.

When relay 716 releases, it in turn releases relay 712 to return the auxiliary trunk circuit 700 to normal. If no other calls have been or are being serviced only relays 420, 529 and a relay in circuit 600 remain operated at this time.

*Line busy*

When a terminating call is to a busy line the sequence of operations that occurs is the same for operating the station selector circuit 806. When the call, for example, is over trunk 705 to the busy line 814 which is already utilizing trunk 405, the selector 841, which is connected to trunk 705 by the operation of relay 825, is operated. When the selector 841 operates, it still causes the ionization of triode 835, but the circuit from ground at the anode of triode 835 is now through operated armature 2 of relay 834 to the control circuit 803 instead of through the normal armature 2 to the line connector circuit 801, since relay 834 was operated for the first call. Relay 834 in the station line circuit 804 is operated as long as line 814 is busy. The path from ground at the anode of triode 835 is through tube 835, the operated armature 2 of relay 834, the winding of the busy relay 837 in control circuit 803, and the operated armature 1 of relay 825 to the tip lead of trunk 705 which is at the negative biasing potential of the multifrequency signal described above. Relay 837 operates, therefore, when the ionization is transferred in tube 835 and line 814 is busy. When relay 837 operates, it connects ground through the 100-ohm resistor 839 and the operated armature 2 of relay 825 to the ring lead of trunk 705. When the low resistance path through the operated armature of relay 837 is provided to the ring lead of trunk 705 the current therethrough is greater than for a call to the idle line 814 because the impedance through the windings of relays 826, 833 and 834, which is the path to the ring lead of trunk 705 for a call to the line 814, is considerably greater. This greater current is sufficient to operate the marginal relay 715 as well as the relay 716 in the auxiliary trunk circuit 700. The operating path for relays 715 and 716 is from ground at the operated armature of relay 837, through the operated armature 2 of relay 825, the ring lead of trunk 705, coil 711, the operated upper armature of relay 732, the serially connected windings of relays 715 and 716 and lamp 717 to battery 718.

When relay 715 operates, it in turn causes the operation of the busy relay 727 by connecting ground through the operated armature of relay 716, the upper operated armature of relay 715, and the normal armature 3 of relay 712 to the winding of relay 727 which is also connected to battery 728. When relay 727 operates, it trips ringing by connecting the 500-ohm resistor 723 across the tip and ring leads of trunk 702. The connection from the tip lead of trunk 702 is through the resistor 723, the operated lower armature of relay 715, and the operated upper armature of relay 727 to the ring lead of trunk 702. When the ringing potential is removed by the switching circuits 701 from the tip and ring leads of the trunk 702, relay 740 releases and in turn releases relay 724. When ringing potential is removed from trunk 702 it also causes relay 837 in the control circuit 803 and the relay 825 in the trunk circuit 800 to release since the windings thereof are connected to the tip lead of trunk 705. When relays 837 and 825 release, they open the connection from ground to the ring lead of trunk 705 causing relays 715 and 716 to release. When relay 715 releases, it connects the busy tone circuit 726 through capacitor 725, the normal lower armature of relay 715 and the operated upper armature of relay 727 to the ring lead of trunk 702. At the same time, relay 715 opens the ring tripping connection through its lower armature.

When the busy tone is received in the switching circuits 701 and the ground potential upon the sleeve lead of trunk 702 is removed, relay 733 releases and in turn successively releases the relays 732 and 730 to return the auxiliary trunk circuit 700 to normal.

It is to be understood that the above-described arrangements are illustrative of the principles of the invention. For example, more or less trunks, concentrator units, subscriber lines and substations may be provided. Numerous other arrangements therefore may be devised by those skilled in the art without departing from the spirit and scope of the invention.

What is claimed is:

1. In a telephone system, a central office; a plurality of concentrator units remotely located from said central office; a plurality of trunks connecting said concentrator units with said central office; a plurality of subscriber stations connected to each of said concentrator units, said concentrator units each comprising a first set of frequency responsive devices associated individually with said trunks, a second set of frequency responsive devices corresponding individually with said stations connected thereto, means responsive to the operation of one of said devices in said first set for connecting all of said devices in said second set to said trunk associated with said operated device in said first set, and means responsive to the operation of one of said devices in said second set for connecting said station corresponding therewith to said trunk associated with said operated device in said first set.

2. In a telephone system, the combination in accordance with claim 1 wherein said devices in said first set of devices in each of said concentrator units are responsive to the same frequency.

3. In a telephone system, the combination in accordance with claim 1 wherein each of said concentrator units comprises in addition connecting means for connecting said trunks therethrough to another one of said concentrator units whereby each of said trunks is connected to each of said units.

4. A concentrator unit comprising a plurality of input terminals; a greater number of output terminals; a first set of frequency responsive devices associated individually with said input terminals; a second set of frequency responsive devices associated with said output terminals; means responsive to the operation of one of said devices in said first set for connecting all of said devices in said second set to the input terminal associated with said operated device in said first set; and means responsive to the operation of one of said devices in said second set for connecting the output terminal associated therewith to said input terminal associated with said operated device in said first set.

5. A chain of concentrator units in accordance with claim 4 wherein each of said units comprises in addition means for connecting said input terminals therethrough whereby said input terminals are connectable to a plurality of said units.

6. In combination with a central office having means for providing a ringing potential of the negative superimposed type having a multifrequency selecting signal superimposed thereon; a plurality of trunking routes; a plurality of concentrator units connected at intervals along said trunking routes; a plurality of substations connected to each of said concentrator units, said concentrator units having frequency responsive devices for connecting a selected one of substations to said central office in accordance with said multifrequency selecting signal.

7. The combination in accordance with claim 6 wherein said central office comprises means for supplying all necessary operating potentials for said concentrator units over said trunking routes.

8. In a telephone system, a central office, a plurality of trunks connected to said central office, groups of subscribers' stations, a remotely located switch individual to each of said groups of stations associated with each of said trunks and connected by said trunks to said central office, a frequency responsive device corresponding to each of said stations, means responsive to a multifrequency superimposed ringing potential on an idle one of said trunks for operating one of said switches, means responsive to the operation of one of said switches for operating one of said devices, and means responsive to the operation of one of said devices for connecting said station corresponding to said operated device to said trunk having said ringing potential thereon.

9. In a telephone system, the combination in accordance with claim 8 wherein each of said stations comprises frequency responsive apparatus tuned to the same frequency as the associated one of said devices.

10. In a telephone system, the combination in accordance with claim 8 comprising in addition means associated with each of said switches for readying one of said switches individual to each group of stations associated with an idle one of said trunks, means responsive to the initiation of a call at one of said stations of one of said groups for operating the readied one of said switches individual to said group, and means responsive to the operation of said readied switch for connecting said calling station to said idle trunk.

11. In a telephone system, the combination in accordance with claim 8 wherein each of said switches comprises a frequency responsive device, and said devices in said switches individual to each of said groups are responsive to the same frequency.

12. In a telephone system, a central office, a plurality of trunks connected to said central office, groups of subscribers' stations, a concentrator unit located remotely from said central office and in the vicinity of each of said groups of stations for connecting any one of said stations of the proximate group of stations to any one of said trunks, means at said central office for readying one of said idle trunks and said units, and means responsive to the initiation of a call at any one of said stations for operating said unit proximate thereto to connect said idle trunk thereto.

13. In a telephone system, the combination in accordance with claim 12 comprising in addition means at said concentrator units responsive to ringing current for a call to an idle one of said stations upon an idle one of said trunks for connecting said idle called station to said idle trunk.

14. In a telephone system, a central office, a plurality of subscribers' stations, a plurality of subsidiary stations remotely located from said central office, means for connecting each of said subscribers' stations to the proximate one of said subsidiary stations, at least one trunk connecting said subsidiary stations in a chain to said central office, and means at each of said subsidiary stations for connecting any one of said subscribers' stations connected thereto to said trunk.

15. In a telephone system, the combination in accordance with claim 14 comprising means at each of said subsidiary stations operable substantially at the same time as said connecting means for disconnecting from said central office the portion of said chain remote from said central office.

16. In a telephone system, a central office; a trunking route conected to said central office; a plurality of concentrator units connected at intervals along said trunking route; at least one substation connected to each of said concentrator units; said trunking route including at least one trunk; said central office comprising means for providing a partially readying potential over a portion of each of said trunks to said concentrator units, means for providing an originating call readying potential over a second portion of one of said trunks, and means for providing a ringing potential to said second portion of one of said trunks; said concentrator units each comprising a first set of frequency responsive devices associated individual with said trunks, a second set of frequency responsive devices corresponding individually with said substations connected thereto, means responsive to the operation of one of said devices in said first set for connecting all of said devices in said second set to said trunk associated with said operated devices in said first set, means responsive to the operation of one of said devices in said second set for connecting said substation corresponding therewith to said trunk associated with said operated devices in said first set, conditioning means for said first and second sets of devices responsive only to a ringing potential of the negative superimposed type, means at said concentrator units for providing a simplex path through a called one of said substations from said second portion of said trunk; and means at said central office for providing a low impedance path to said devices in said first and second sets.

17. In a telephone system, a central office; a plurality of concentrator units located remote from said central office; a plurality of subscriber lines; said subscriber lines being divided into groups of subscriber lines, each of said groups of subscriber lines being connected to a different one of said concentrator units; each of said concentrator units being characterized by a concentrator identifying signal of distinctive frequency; each of said subscriber lines in each of said groups of subscriber lines being characterized by a line identifying signal of distinctive frequency; a plurality of trunks connected to said central office; said concentrator units being connected in tandem by all of said trunks in parallel; means in each of said concentrator units responsive to calls originated over the subscriber lines connected thereto for connecting said subscriber lines connected thereto to idle ones of said trunks; signal means in said central office for generating the concentrator identifying signals characterizing said concentrator unit and for generating the line identifying signals characterizing the subscriber lines in each of said groups of subscriber lines; a unit signal responding means in each of said concentrator units, each of said unit signal responding means adapted to be energized over said idle one of said trunks by the concentrator identifying signal characterizing the concentrator unit at which it is located; a plurality of line signal responding means in each of said concentrator units, each of said line signal responding means at each of said concentrator units adapted to be energized over said idle one of said trunks by the line identifying signal characterizing the subscriber line with which it is associated; means in each of said concentrator units controlled by its unit signal responding means for connecting said plurality of line signal responding means thereat to said idle one of said trunks; and means in each of said concentrator units controlled by an energized line signal responding means thereat for connecting the subscriber line associated with said energized line signal responding means to said idle one of said trunks selected by said first switching means.

References Cited in the file of this patent

UNITED STATES PATENTS

| | | |
|---|---|---|
| 2,345,628 | Pierson | Apr. 4, 1944 |
| 2,688,662 | Den Hertog et al. | Sept. 7, 1954 |